United States Patent

Stahl et al.

[11] Patent Number: 5,898,184
[45] Date of Patent: Apr. 27, 1999

[54] READING OF INFORMATION IN RADIATION EMITTED FROM STORAGE MEDIA

[75] Inventors: Werner Stahl, Heimstetten; Peter Schwelle, Weilheim; Detlef Brautmeier, Unterschleissheim, all of Germany

[73] Assignee: Agfa-Gevaert AG, Leverkusen, Germany

[21] Appl. No.: 08/895,196

[22] Filed: Jul. 16, 1997

[30] Foreign Application Priority Data

Jul. 20, 1996 [DE] Germany ............... 196 29 299

[51] Int. Cl.⁶ .................................................. G03B 42/02
[52] U.S. Cl. ................................. 250/584; 250/586
[58] Field of Search .......................... 250/584, 585, 250/586

[56] References Cited

U.S. PATENT DOCUMENTS

| | | |
|---|---|---|
| 4,346,295 | 8/1982 | Tanaka et al. . |
| 4,485,302 | 11/1984 | Tanaka et al. . |
| 4,893,011 | 1/1990 | Bauer et al. . |
| 5,404,024 | 4/1995 | Namiki ................... 250/586 |
| 5,530,260 | 6/1996 | Arakawa ................. 250/586 |

FOREIGN PATENT DOCUMENTS

| | | |
|---|---|---|
| 0 144 856 A2 | 6/1985 | European Pat. Off. . |
| 29 51 501 A1 | 7/1980 | Germany . |
| 37 31 203 A1 | 3/1989 | Germany . |
| 43 29 691 A1 | 3/1994 | Germany . |
| 295 10 683 U1 | 10/1995 | Germany . |
| 1-11256 | 1/1989 | Japan ................... 250/585 |
| 64-946 | 1/1989 | Japan ................... 250/585 |

OTHER PUBLICATIONS

Feingeratetechnik, p. 45, Jan. 1964.

*Primary Examiner*—Constantine Hannaher
*Assistant Examiner*—Darren M. Jiron
*Attorney, Agent, or Firm*—Darby & Darby

[57] ABSTRACT

An arrangement for detecting an image on a phosphorescent foil has two light conductors which lead to a common photomultiplier. The light conductors are spaced from one another by a small gap which allows a laser beam to pass between the conductors and excite the foil. The light conductors have flat end faces for the admission of light into the conductors, and the end faces are directed towards the foil as well as the gap. The end faces make an angle of 10 to 30 degrees with the foil. The light conductors are designed so that the greater part of impinging radiation is admitted into and travels the length of a conductor only when the path of the radiation and a normal to the respective end face define an angle which is equal to or less than the acceptance angle of the conductor. Each end face has an edge remote from the gap, and a location at which the laser beam impinges the foil defines a plane with a location on either edge. The impingement location of the laser beam defines a line with each edge location, and each line makes an angle equal to or less than the acceptance angle with a normal to the respective end face. A reflector can be mounted adjacent either edge to reflect light emitted from the foil towards the end faces.

22 Claims, 4 Drawing Sheets

READING OF INFORMATION IN RADIATION EMITTED FROM STORAGE MEDIA

BACKGROUND OF THE INVENTION

The invention relates to the reading of information which is contained in radiation emitted by information storage media.

A luminescent foil or plate can be provided with latent information, e.g., an image, which is releasable in the form of radiation when the foil is stimulated or excited. Phosphor foils, which constitute one type of luminescent foil, are being substituted with increasing frequency for conventional x-ray film in medical diagnostics. As compared to conventional x-ray film, phosphor foils have the advantage of almost linear reproduction characteristics. The image quality is therefore much less susceptible to an overly large or excessively small dose during the production of an x-ray image. Phosphor foils also have the advantage that they can be reused. Thus, once an x-ray picture has been made and the recorded information read and stored in an electronic device, a phosphor foil can be erased and used for additional x-ray images. A further advantage of phosphor foils is that their mechanical handling characteristics are largely the same as those of conventional x-ray film. For the most part, existing loading and unloading apparatus for x-ray film handling devices, such as x-ray film cassettes, can accordingly be used for phosphor foils as well.

The German Patent Publication No. 37 31 203 A1 discloses a method and apparatus for handling phosphor foils. Here, a phosphor foil is first loaded in an x-ray film cassette. Data relevant for an x-ray exposure to be made on the foil are then entered in a semiconductor memory on the cassette at an identification station. These data include patient name, birth date, treating physician, etc. An x-ray exposure is subsequently made. To read the x-ray image, the cassette is inserted in a digital reading apparatus. The cassette is opened, and the phosphor foil is removed and excited by a scanning device. The phosphor foil emits light which is taken up by a light collecting device and converted into a grid of digital signals. These signals can be processed in a digital image processing unit.

When a phosphor foil is scanned to recover information, one of the considerations is to detect as much of the emitted radiation as possible. As a rule, the foil is excited by a laser beam which causes the stored x-ray energy to be released in the form of low-energy radiation, advantageously in the form of visible light having a predetermined wavelength.

The German Patent Publication No. 29 51 501 teaches a device for reading information in radiation. The device takes up the radiation emitted by a luminescent foil or plate and conducts it to a radiation detector. This device has a drawback in that rays which travel almost perpendicular to the foil either do not penetrate the light conducting arrangement leading to the radiation detector or impinge upon the conducting arrangement at a very large angle. In the latter case, the rays are poorly coupled when the light conducting arrangement consists of optical fibers.

SUMMARY OF THE INVENTION

It is an object of the invention to provide an arrangement which allows a greater proportion of the radiation emitted by an information storage medium to be detected.

Another object of the invention is to provide a method which makes it possible to improve the detection of radiation emitted by an information storage medium.

The preceding objects, as well as others which will become apparent as the description proceeds, are achieved by the invention.

One aspect of the invention resides in an arrangement for reading information in radiation emitted from an excitable surface. The arrangement comprises means for supporting the excitable surface in a predetermined plane, means for exciting the excitable surface, and a pair of radiation conductors which are spaced from one another to define a gap. The exciting means is arranged to generate a stimulus at predetermined locations of the gap in the predetermined plane. Each of the conductors has an end face for the admission of radiation into the respective conductor, and the end faces face the predetermined plane. At least one selected end face defines an angle of about 10 degrees to about 30 degrees with the predetermined plane. The selected end face is designed so that the predominant part of impinging radiation is admitted into and travels the length of the respective conductor only when the radiation advances along a path which makes an angle equal to or less than an acceptance angle with a normal to the selected end face. The selected end face has an edge location which is remote from the gap and defines a line with a selected one of the predetermined locations of the gap. The line makes an angle equal to or less than the aforementioned acceptance angle with a normal to the selected end face.

The radiation conductors may be arranged to direct radiation traveling through the same to radiation detector means. The means for exciting the excitable surface can, for instance, include means for producing a laser beam.

Reflector means may be disposed in the region where radiation emitted by the excitable surface enters the radiation conductors. The reflector means is situated remotely from the gap between the radiation conductors and may include reflectors which are mounted at the edges of the end faces of the radiation conductors. The reflector means enables the radiation coming from the excitable surface to be optimally coupled into the radiation conductors. When the radiation conductors comprise optical fibers, favorable coupling angles may be achieved over the entire end faces of the radiation conductors, i.e., coupling angles which are essentially perpendicular to the entry faces of the fibers.

As indicated above, at least one of the radiation conductors is arranged with the end face thereof at a relatively small angle of inclination to the plane of the excitable surface. Advantageously, both of the radiation conductors are arranged in such fashion. Moreover, it is preferred for the end faces of the radiation conductors to be disposed in the immediate vicinity of the locations at which the exciting means acts. This enables those rays which leave the excitable surface close to the direction of travel of the incoming exciting energy to be largely coupled into the radiation conductors. An arrangement of this type is especially favorable for excitable surfaces whose spatial emission characteristics correspond to or resemble Lambert emission characteristics. Thus, for an excitable surface exhibiting Lambert emission characteristics, the greatest radiation intensity is perpendicular to the surface.

The reflector means can be fixed to the radiation conductors. This permits adjustment of the reflector means with respect to the radiation conductors to be greatly simplified since relative movements, particularly during vibration of the reading arrangement, are virtually eliminated.

The reflector means is designed so that the emitted rays coupled into the radiation conductors have an entry angle at most equal to the maximum coupling angle, i.e., the acceptance angle, of the conductors. For optical fibers, the maximum coupling angle is typically about 30 degrees. The maximum coupling angle, or acceptance angle, is the largest angle which radiation can make with a normal to the end face of a radiation conductor and still be totally reflected at the inner surfaces of the conductor, that is, still can travel the length of the conductor.

The reflectors of the reflector means can have curved reflecting surfaces. This allows emitted rays which travel away from the excitable surface sideways to be reflected so that they impinge upon the end faces of the radiation conductors at as large an angle as possible, preferably perpendicularly. It is of advantage for the reflecting surfaces to be heat-treated in such a manner that they have especially high reflectance for the wavelengths of the emitted radiation.

The radiation detector means may comprise a common radiation detector for the two radiation conductors, and the radiation conductors can be combined in the vicinity of the radiation detector. The unit formed from the combined radiation conductors may have a shape which matches that of the radiation detector. It is preferred for the exit face of the unit as well as the entry face of the radiation detector to be circular. However, these faces can also have other shapes such as rectangular.

The radiation detector means can, for instance, include a photomultiplier.

Another aspect of the invention resides in a method of reading information stored in a storage medium. The method comprises the steps of providing a pair of radiation conductors each having an end face for admission of radiation into the respective conductor. At least one selected end face is designed so that the predominant part of impinging radiation is admitted into and travels the length of the respective conductor only when the radiation advances along a path which makes an angle equal to or less than an acceptance angle with a normal to the selected end face. The method further comprises the step of positioning the conductors with a gap between the same and with the end faces directed towards the gap and towards a predetermined plane. The positioning step includes establishing an angle of about 10 degrees to about 30 degrees between the selected end face and the predetermined plane. The selected end face has an edge location, and the positioning step also includes locating the edge location remotely from the gap so that the edge location and a selected location of the gap in the predetermined plane define a line making an angle equal to or less than the aforementioned acceptance angle with a normal to the selected end face. The method additionally comprises the steps of arranging the storage medium with a surface portion thereof in the predetermined plane and passing through the selected location, and exciting the surface portion at the selected location to cause emission of radiation from the surface portion towards the end faces. The exciting step can include directing a laser beam towards the selected location.

The method may involve photoelectrically converting radiation which has traveled through the conductors into electronic signals.

Additional features and advantages of the invention will be forthcoming from the following detailed description of preferred embodiments when read in conjunction with the accompanying drawings.

DESCRIPTION OF THE PREFERRED EMBODIMENTS

Figure 1:
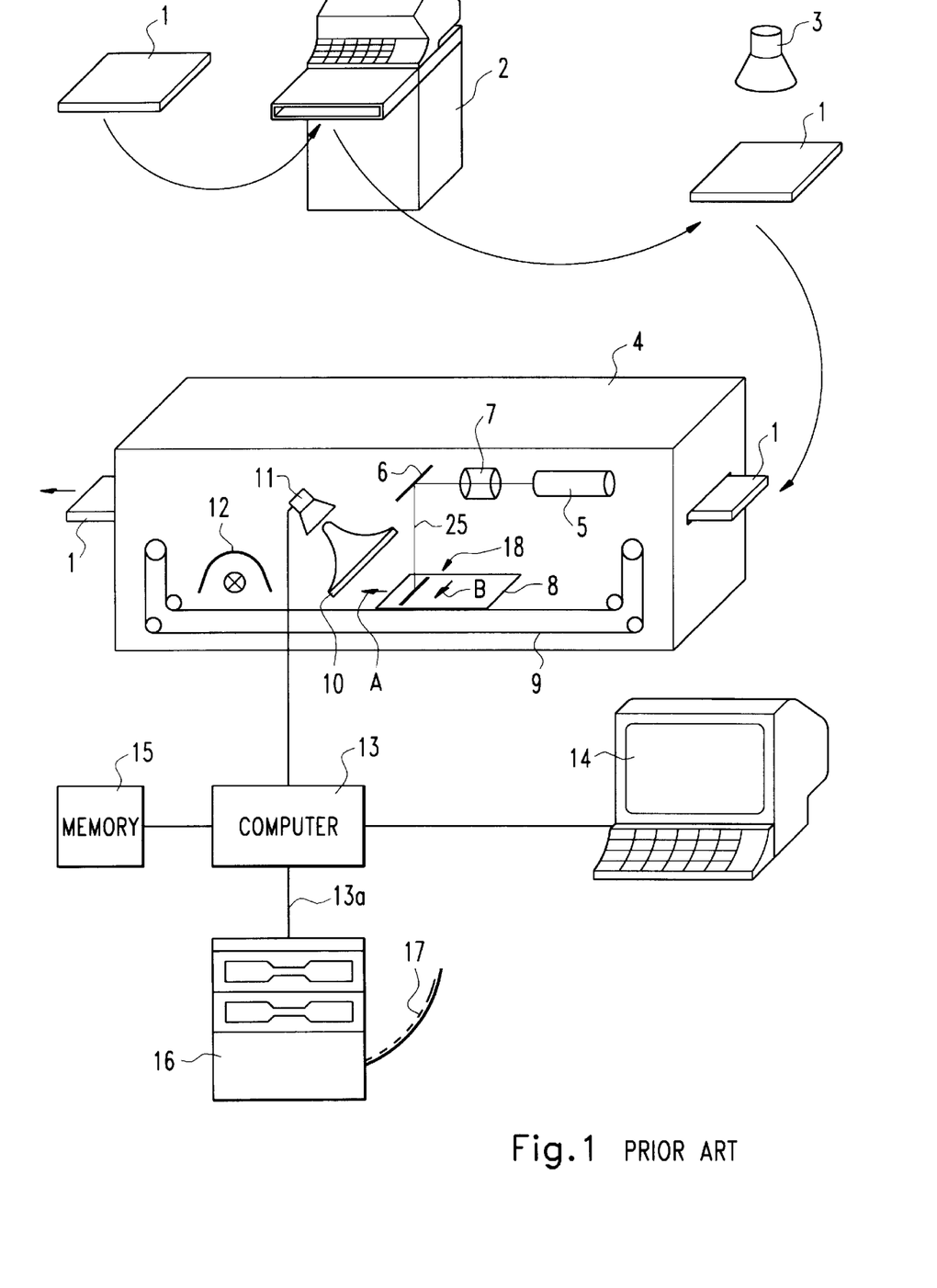
FIG. 1 schematically illustrates a prior art x-ray imaging and processing system.

FIG. 1 shows an x-ray imaging and processing system in accordance with the prior art. The system of FIG. 1 is designed for the digital processing of x-ray images.

The numeral 1 identifies an x-ray cassette containing an image carrier which can be excited or stimulated so as to emit radiation. The image carrier is in the form of a foil or plate and is here assumed to be a phosphor foil 8.

The cassette 1 is inserted in an identification station 2 where data relevant for an x-ray exposure to be made on the phosphor foil 8 are entered in a semiconductor memory mounted on the cassette 1. These data include patient name, area imaged, treating physician, etc. The data can be entered manually via a console at the identification station 2 or, alternatively, can be read directly into the memory from a digital patient data card. Furthermore, the identification station 2 can be provided with menus which make it possible to select desired parameters for analysis of the foil 8.

Once the cassette 1 has been provided with identifying data, an x-ray image is made using an x-ray tube 3. The x-ray image is formed on the phosphor foil 8 in a latent state.

To read the latent image, the cassette 1 is inserted in a digital scanning apparatus 4. A non-illustrated mechanical device in the scanning apparatus 4 opens the cassette 1 and removes the phosphor foil 8. The foil 8 is then advanced to a reading or scanning station 18 by way of a transport band 9. The reading station 18 includes a laser 5, a movable reflector 6, an objective 7, a radiation or light conducting device 10 and a radiation or light detector in the form of a photomultiplier 11. By way of example, the movable reflector 6 may be mounted for pivotable movement or may be in the form of a rotating polygon.

The laser 5, which constitutes a means for exciting or stimulating the phosphor foil 8, generates a laser beam 25. Depending upon the nature of the phosphor foil 8, the laser beam 25 can have a wavelength in the infrared, red or green range. The objective 7 focuses the laser beam 25 on the upper surface, as seen in FIG. 1, of the foil 8. The movable reflector 6 directs the laser beam 25 across the foil 8 point-by-point along a series of lines in a direction indicated by the arrow B. The laser beam 25 thus scans the foil 8 point-by-point and line-by-line. During the scanning procedure, the foil 8 is advanced by the transport band 9 in a slow scan direction denoted by the arrow A.

In addition to conveying the foil 8 in the direction A, the transport band 9 functions to support the foil 8 with the upper surface thereof in a predetermined plane which is horizontal in FIG. 1.

The laser beam 25 excites or stimulates those areas of the foil 8 containing the latent x-ray image thereby causing radiation, e.g., light, to be emitted from such areas. The emitted radiation is collected by the radiation conducting device 10 which guides the radiation to the photomultiplier 11. The photomultiplier 11 converts the emitted radiation to electronic signals and amplifies the latter. The amplified signals are digitized and sent to a computer 13 having a memory for the digitized x-ray image obtained from the foil 8.

If desired, the signals can be passed through conventional filters such as an antialiasing filter and/or can be electronically compressed.

After the phosphor foil 8 has been scanned, the foil 8 is erased by an erasing device 12. The foil 8 is then reloaded in the cassette 1 and is available for the production of another x-ray image.

The digitized image contained in the computer 13 can be sent to a digital memory 15 for storage or to a diagnostic monitor 14 having a screen for displaying and analyzing the image. It is further possible to transmit the image through an interface 13a to a hard copy device 16 which prints the image on photographic film 17. By way of the interface 13a, the image can also be sent to any other digital image processing system.

Figure 2:
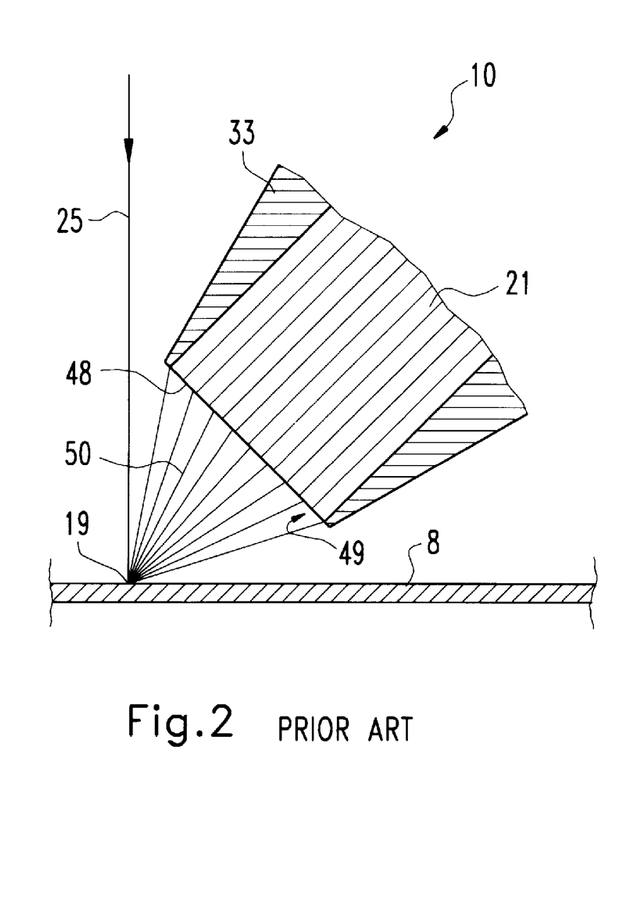
FIG. 2 is a fragmentary enlarged sectional view of a prior art radiation conducting device forming part of the system of FIG. 1.

FIG. 2 is an enlarged view of the radiation or light conducting device 10. This radiation conducting device 10 is a prior art device which is used, for example, in the Agfa Diagnostic Center (ADC 70) marketed by the instant assignee.

The radiation conducting device 10 includes a radiation or light conductor 21 made up of a large number of optical fibers. The radiation conductor 21 constitutes a core which is held in a jacket or fiber module 33. The optical fibers, which are preferably adhesively secured in the jacket 33, are ordered in that they extend substantially parallel to one another. The fibers are made of plastic or glass and have entry end faces 48 which are cut or ground so as to be essentially flat and perpendicular to the longitudinal axes of the fibers.

The entry end faces 48 of the optical fibers are coplanar and define a flat entry end face 49 of the radiation conductor 21. The entry end faces 48, 49 are directed towards the upper surface, as seen in FIG. 2, of the phosphor foil 8. The end face 49 is here rectangular but can have other shapes.

The optical fibers have typical acceptance angles which lie within a range of approximately 30 degrees about a normal to the entry end face 49 of the radiation conductor 21. The term "acceptance angle" is conventional in fiber optics and denotes the largest angle which radiation can make with a normal to the end face 49 and still undergo total reflection at the inner surfaces of the fibers. Total reflection means that radiation is repeatedly reflected inside a fiber in such a manner that the radiation travels the length of the fiber. At least the predominant part of the radiation which impinges upon the end face 49 at an angle equal to or less than the acceptance angle is admitted into the fibers under conditions which allow the radiation to be totally reflected at the inner surfaces of the fibers. The proportion of the radiation admitted into the fibers under conditions which allow total reflection is greatest for radiation which impinges upon the end face 49 normal thereto and decreases with increasing deviation of the impingement angle from 90 degrees.

In FIG. 2, the laser beam 25 hits the upper surface of the phosphor foil 8 at an impingement point 19. The laser beam 25 stimulates the foil 8 to emit radiation which propagates into the space above the foil 8 in accordance with a Lambert radiation distribution. The radiation emitted by the foil 8 can, for instance, be in the form of green or blue light but may also have a wavelength outside of the visible range, e.g., in the ultraviolet range. The wavelength of the laser beam 25 depends upon the nature of the phosphor foil 8 and can lie in the visible range, e.g., at 633 nm, or in the infrared range. The emitted radiation, which is the product of energy stored in the foil 8, typically has a shorter wavelength than the stimulating radiation.

Rays 50 of the emitted radiation travel to and enter the radiation conductor 21. The rays 50 which travel to the center, or the area near the center, of the radiation conductor 21 impinge upon the entry end face 49 of the radiation conductor 21 at an angle of 90 degrees or approximately 90 degrees. On the other hand, the rays 50 which travel to the edges, or the areas near the edges, of the radiation conductor 21 impinge upon the entry end face 49 at an angle significantly different from 90 degrees. Accordingly, the proportion of the radiation which is coupled into or enters the optical fibers under conditions allowing total reflection is greater at or near the center of the radiation conductor 21 than at or near the edges thereof.

Figure 3:
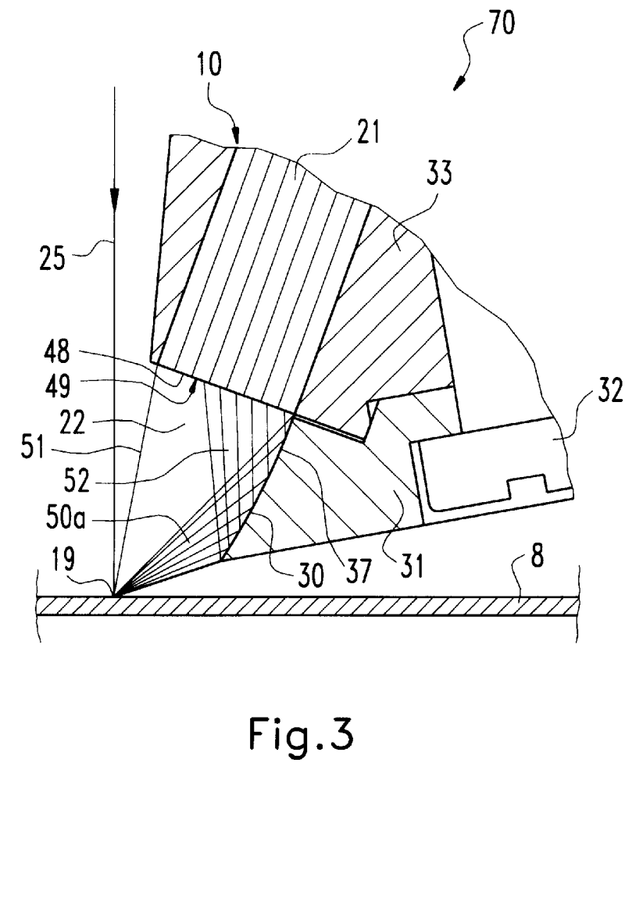
FIG. 3 is a fragmentary sectional view of a radiation conducting unit in accordance with the invention.

FIG. 3 illustrates a radiation conducting unit 70 according to the invention. In FIG. 3, the same numerals as in FIGS. 1 and 2 are used to identify similar elements.

The radiation conducting unit 70 includes the radiation conducting device 10. Radiation is again emitted from the impingement point 19 on the upper surface of the phosphor foil 8 in response to impingement of the laser beam 25 on the point 19. Some rays of the emitted radiation, which are not shown in FIG. 3 and correspond to the rays 50 of FIG. 2, travel directly to the entry end face 49 of the radiation conductor 21 via an entry gap 22. Other rays 50a of the emitted radiation leave the impingement point 19 along paths which pass beneath and do not intersect the end face 49.

A reflecting block 31 is fixed to the radiation conducting device 10 at the edge of the radiation conductor 21 and on the side of the gap 22 remote from the impingement point 19. The reflecting block 31 can, for instance, be secured to the jacket 33 of the radiation conducting device 10 by screws 32. The reflecting block 31 is provided with a reflecting surface 30 having high reflectance for radiation of the wavelengths emitted by the phosphor foil 8. The reflecting surface 30 can be formed on a heat-treated layer 37 which is designed to reflect the emitted radiation better than the exciting radiation of the laser beam 25.

The reflecting surface 30 serves to reflect the emitted rays 50a to the end face 49 of the radiation conductor 21 as indicated at 52. The reflecting surface 30 can be flat but may also be curved as shown in FIG. 3. The curvature of the reflecting surface 30 allows the reflected rays 52 to be optimally coupled into the optical fibers of the radiation conductor 21. Thus, the curvature can be selected so that all of the reflected rays 52 impinge upon the end face 49 at such a large angle that the conditions for total reflection in the optical fibers of the radiation conductor 21 are fulfilled. Experiments have demonstrated that, with the setup of FIG. 3, considerably more of the optical fibers are bright at the exit ends thereof than with the setup of FIG. 2. In other words, when using the setup of FIG. 3, more radiation is admitted into the optical fibers and more radiation satisfies the conditions for total reflection in the fibers.

The numeral 51 denotes a straight path between the impingement point 19 and a point on that edge of the radiation conductor 21 located on the side of the entry gap 22 nearest the impingement point 19. The path 51, which lies in a plane parallel to or coincident with the plane of FIG. 3, is the path followed by emitted rays which make the maximum possible angle with the upper surface of the phosphor foil 8 while still being coupled into the radiation conductor 21. Due to the design of the radiation conducting unit 70 of FIG. 3, the emitted rays which travel along the path 51 impinge upon the end face 49 of the radiation conductor 21 almost perpendicularly. As a result of the Lambert radiation characteristics of the emitted radiation, these rays are the brightest of the emitted rays. Since the emitted rays which follow the path 51 impinge upon the end face 49 essentially at right angles, they are optimally guided by the radiation conductor 21, i.e., they travel the entire lengths of the optical fibers with minimum losses.

Exemplary geometric details of the radiation conducting unit 70 of FIG. 3 are described below with reference to FIG. 4 where 59 denotes the plane of the upper surface of the phosphor foil 8. The numeral 54 identifies a perpendicular to the plane 59 at the impingement point 19.

The jacket 33 of the radiation conducting device 10 has an edge 53 which faces the plane 59 and is located on the side of the entry gap 22 nearest the impingement point 19. The edge 53 is spaced from the perpendicular 54 by a distance a of 1.0 mm and from the plane 59 by a distance f of 6.5 mm.

The radiation conductor 21 has a width b of 4.0 mm. The optical fibers of the radiation conductor 21 are arranged parallel to one another along a direction C and are inclined to the perpendicular 54 at an angle alpha of 10 degrees to 30 degrees. It is preferred for alpha to be 20 degrees. The entry end face 49 of the radiation conductor 21 is correspondingly inclined to the plane 59 at an angle of 10 degrees to 30 degrees, and preferably an angle of 20 degrees.

When the reflecting surface 30 is curved, the curvature is matched to the shape of the end face 49 of the radiation conductor 21. The reflecting surface 30 can have a circular configuration, an elliptical configuration or some other curved configuration. The configuration of the reflecting surface 30 is selected in dependence upon the optical boundary conditions. The optimal curvature for the reflecting surface 30 can be obtained, for instance, by an interpolation procedure using an ideal point of reflection on an ideal reflecting surface.

Figure 4:
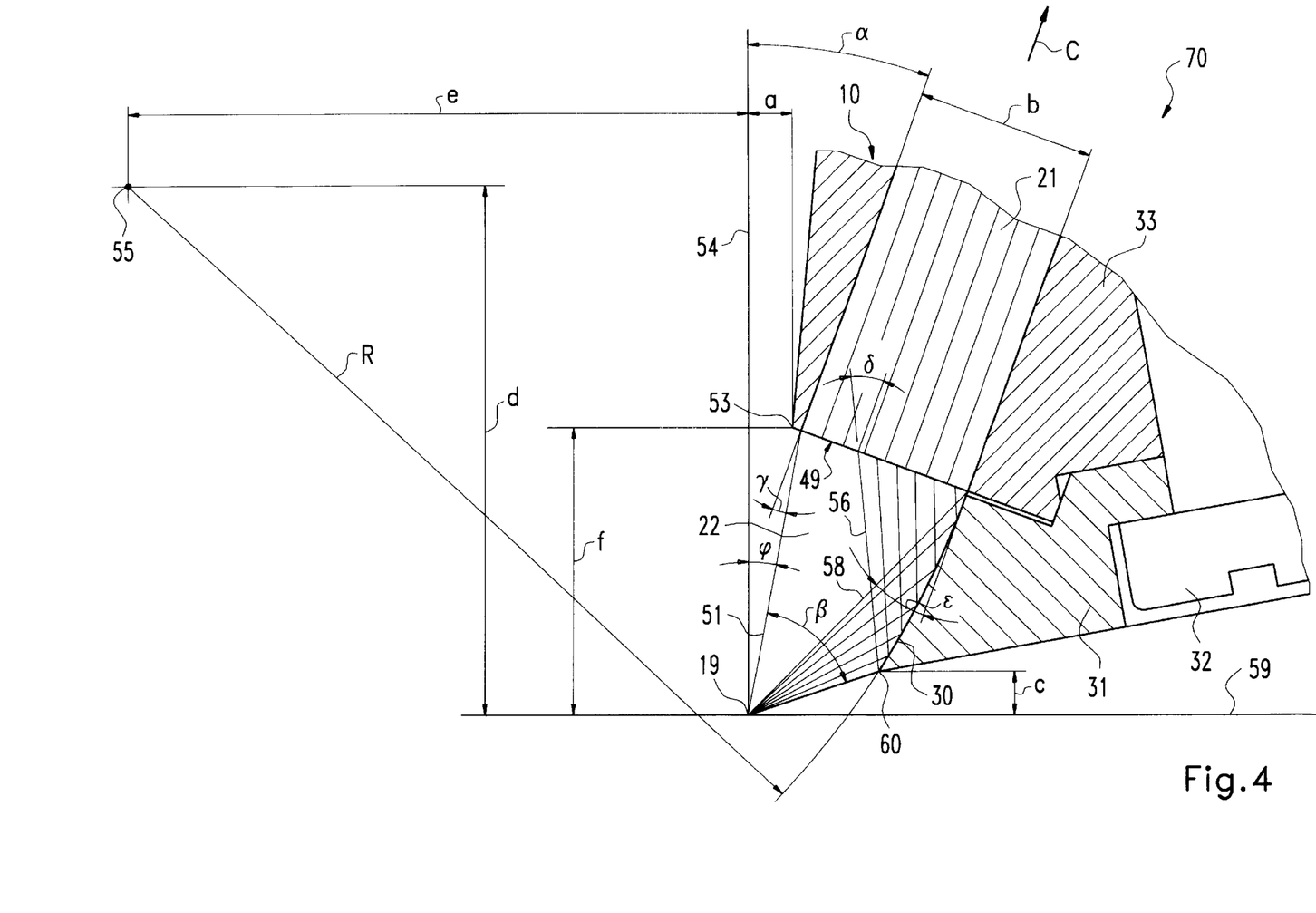
FIG. 4 is similar to FIG. 3 but illustrates the geometry associated with the radiation conducting unit of FIG. 3.

The reflecting surface 30 can be circular for the radiation conducting arrangement of FIG. 4. By way of example, the radius of curvature R is then 10 mm to 30 mm, and advantageously 20.1 mm. The distance d between the plane 59 and the center 55 of the reflecting surface 30 is 11.9 mm while the distance e between the perpendicular 54 and the center 55 is 13.9 mm. Furthermore, the distance c between the plane 59 and the lowermost edge 60 of the reflecting surface 30 is about 1 mm. As the distance c decreases, the amount of radiation which can be coupled into the radiation conductor 21 increases. Accordingly, it may be desirable to shift the radiation conducting arrangement so that the lowermost edge 60 of the reflecting surface 30 is less than 1 mm from the plane 59.

The numeral 58 denotes a straight path between the impingement point 19 and a point on that edge of the radiation conductor 21 located on the side of the entry gap 22 remote from the impingement point 19. The path 58 is the path followed by emitted rays which make the minimum possible angle with the plane 59 while still being coupled into the radiation conductor 21 without reflection by the reflecting surface 30.

The numeral 56 identifies a straight path between a point on the lowermost edge 60 of the reflecting surface 30 and a point on the end face 49 of the radiation conductor 21. The path 56 is the path followed by emitted rays which have been reflected to the end face 49 from the lowermost edge 60 of the reflecting surface 30.

The path 51 makes an angle gamma, the path 56 an angle delta and the path 58 an angle epsilon with a normal to the end face 49. The angles gamma, delta and epsilon all have magnitudes such that the predominant part of the radiation traveling along the paths 51, 56, 58 can undergo total reflection in the radiation conductor 21. Thus, each of the angles gamma, delta and epsilon is equal to or less than the acceptance angles of the optical fibers in the radiation conductor 21. As indicated earlier, the acceptance angles lie within approximately 30 degree of a normal to the end face 49. The angle alpha is here 9.5 degrees, the angle delta 25.4 degrees and the angle epsilon 24.7 degrees.

The angle beta, which has a magnitude of 71.6 degrees, represents the angular spread of the emitted radiation which travels from the impingement point 19 to the end face 49.

Due to the Lambert radiation distribution of the emitted rays, the most intense of the emitted rays are those which travel along the path 51 as mentioned previously. These rays and the path 51 make an angle phi of 10.5 degrees with the perpendicular 54.

Figure 5:
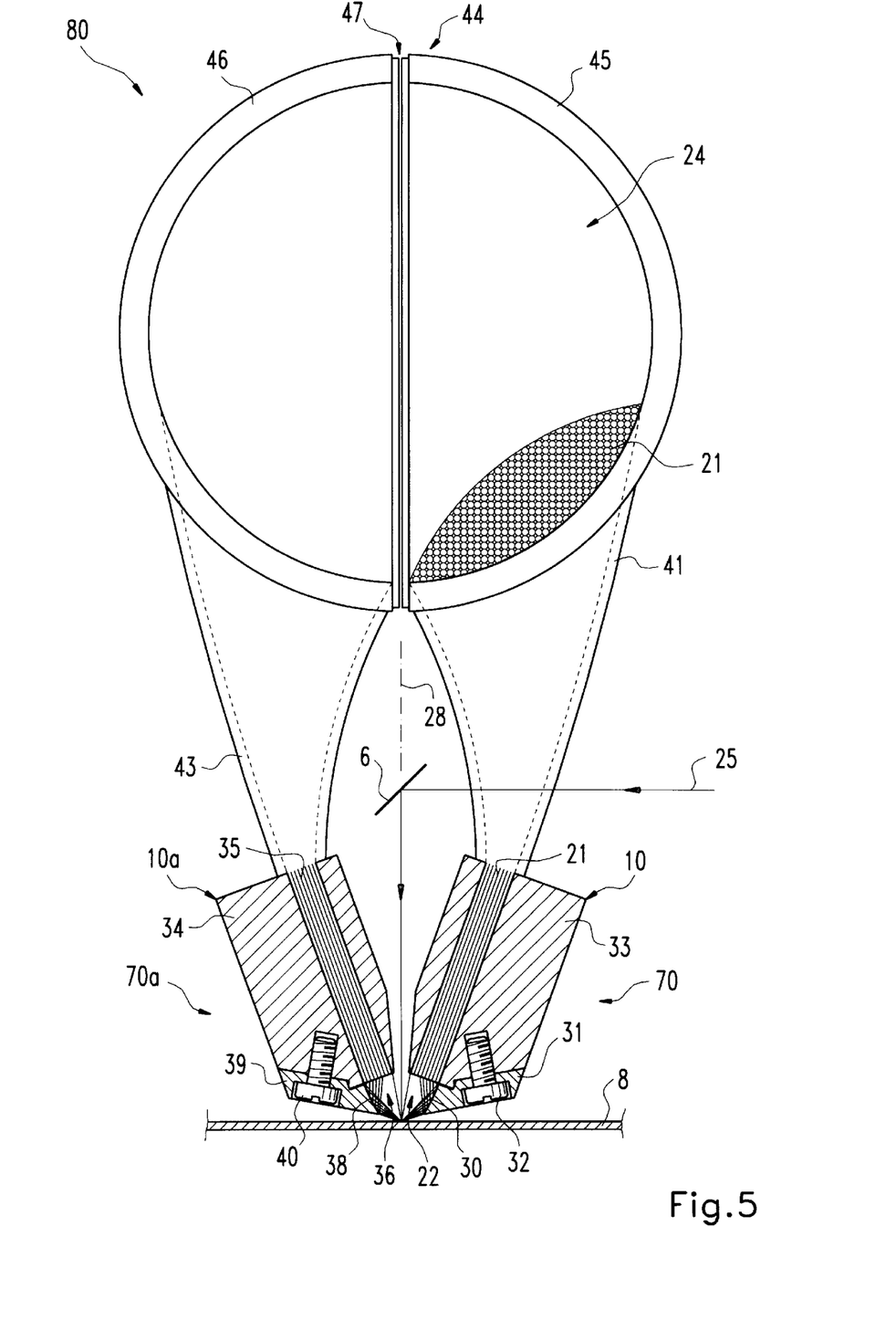
FIG. 5 is a partly sectional, partly broken away view of a radiation conducting article including two radiation conducting units according to the invention.

FIG. 5 illustrates a radiation conducting article 80 in accordance with the invention.

The radiation conducting article 80 comprises the radiation conducting unit 70 of FIG. 3 and a second radiation conducting unit 70a which may be identical to the unit 70. The radiation conducting unit 70a includes a radiation conducting device 10a having a jacket or fiber module 34 which holds a radiation conductor 35. The radiation conductor 35 is made up of a large number of optical fibers which are parallel to one another. A reflecting block 39 is mounted on the jacket 34 of the radiation conducting device 10a and is provided with a reflecting surface 38. The reflecting block 39 may, for instance, be secured to the jacket 34 by screws 40. The radiation conductor 35 has a flat entry end face which is directed towards the phosphor foil 8 and is spaced therefrom by an entry gap 36.

The radiation conducting units 70, 70a are arranged mirror symmetrically with reference to one another about a plane 28 which is normal to the upper surface of the phosphor foil 8. The units 70, 70a are spaced from one another to define a narrow gap, and the plane 28 passes through the gap. The laser beam 25 travels to the phosphor foil 8 in the plane 28, and the gap between the units 70, 70a is just wide enough for the laser beam 25 to pass without being reflected by one of the units 70, 70a. The reflector 6 directs the laser beam 25 lengthwise of the gap point-by-point.

The jackets 33, 34 hold the radiation conductors 21, 35 rigidly. The entry end faces of the radiation conducting units 70, 70a, which are here rectangular, are inclined to the upper surface of the phosphor foil 8 at an angle of 10 degrees to 30 degrees, and preferably an angle of 20 degrees. Each of the end faces has an edge remote from the gap between the units 70, 70a, and an impingement point of the laser beam 25 on the upper surface of the foil 8 defines a straight line with a point on either of the edges. The lines lie in a plane parallel to or coincident with the plane of FIG. 5, and each line makes an angle equal to or less than the acceptance angles of the optical fibers with a normal to the respective end face.

The reflecting surfaces 30, 38 are elliptical and a focal point of each reflecting surface 30, 38 lies in the plane 28 on the upper surface of the phosphor foil 8.

A textile sheath 41 is secured to the jacket 33 at the end thereof remote from the entry end face of the radiation conductor 21. The sheath 41, which is lightproof and flexible, extends from the jacket 33 to a metal frame or holder 45 having a half-moon shape. The frame 45 is located at a radiation exit end 24 of the radiation conducting article 80.

The radiation conductor 21 passes from the jacket 33 into the sheath 41 and through the latter to the frame 45. The optical fibers of the radiation conductor 21 are loosely arranged in the sheath 41 so that they are flexibly accommodated therein. The radiation conductor 21 terminates at the frame 45 where the optical fibers of the conductor 21 have exit ends for radiation which has traveled through the fibers. The exit ends are embedded in the frame 45 which holds the optical fibers rigidly.

A second textile sheath 43 is secured to the jacket 34 at the end thereof remote from the entry end face of the radiation conductor 35. The sheath 43, which is lightproof and flexible, extends from the jacket 34 to a metal frame or holder 46 having a half-moon shape. The frame 46 is located at the radiation exit end 24 of the radiation conducting article 80.

The radiation conductor 35 passes from the jacket 34 into the sheath 43 and through the latter to the frame 46. The optical fibers of the radiation conductor 35 are loosely arranged in the sheath 43 so that they are flexibly accommodated therein. The radiation conductor 35 terminates at the frame 46 where the optical fibers of the conductor 35 have exit ends for radiation which has traveled through the fibers. The exit ends are embedded in the frame 46 which holds the optical fibers rigidly.

The radiation conducting article 80 may be substituted for the radiation conducting device 10 in the system of FIG. 1. The photomultiplier 11 of the system has a circular window for the admission of radiation into the photomultiplier 11 and each of the frames 45, 46 is matched to the window. Thus, each of the frames 45,46 would cover one-half of the window if placed against the latter. To use the radiation conducting article 80 in the system of FIG. 1, the frames 45, 46 are abutted against one another as indicated at 47 to form a circular transition member 44 having a diameter equal or approximately equal to that of the photomultiplier admitting window. When the radiation conducting article 80 is substituted for the radiation conducting device 10 in the system of FIG. 1, the photomultiplier 11 is common to both of the radiation conductors 21, 35.

Various modifications are possible within the meaning and range of equivalence of the appended claims. For example, if the radiation conducting article 80 is to be used for a photomultiplier having a radiation admitting window of rectangular, square or other configuration, the transition member 44 can be shaped accordingly. Furthermore, while the laser beam 25 is shown to impinge upon the upper surface of the phosphor foil 8 perpendicularly, the laser beam 25 can be directed onto such surface at an angle different from 90 degrees.

We claim:

1. An arrangement for reading information in radiation emitted from an excitable surface portion, comprising means for supporting the excitable surface portion in a predetermined plane; means for exciting the excitable surface portion; and a pair of radiation conductors which are spaced from one another to define a gap, and wherein at least one of said conductors comprises a plurality of optical fibers, said exciting means being arranged to generate a stimulus at predetermined locations of said gap in said plane, and each of said conductors having an end face for admission of radiation into the respective conductor, said end faces facing said predetermined plane, and at least one of said end faces defining an angle of about 10 degrees to about 30 degrees therewith, said one end face being designed so that the predominant part of impinging radiation is admitted into and travels along the length of the respective conductor only when the radiation advances along a path which makes an angle equal to or less than an acceptance angle with a normal to said one end face, and said one end face having an edge location which is remote from said gap and defines a line with a selected one of said predetermined locations, said line making an angle equal to or less than said acceptance angle with a normal to said one end face.

2. The arrangement of claim 1, wherein said exciting means comprises means for producing a laser beam.

3. The arrangement of claim 1, wherein at least one of said conductors comprises a flexible section.

4. The arrangement of claim 3, further comprising a photodetector for said one conductor, said photodetector having an entry end for radiation traveling through said one conductor, and said one conductor having an exit end for the radiation, said exit end matching or approximately matching at least part of said entry end.

5. The arrangement of claim 4, wherein said end face of said one conductor is substantially rectangular and rigid, said exit end being substantially rigid.

6. The arrangement of claim 4, wherein said exit end is substantially semicircular.

7. An arrangement for reading information in radiation emitted from an excitable surface portion, comprising means for supporting the excitable surface portion in a predetermined plane; means for exciting the excitable surface portion; and a pair of radiation conductors which are spaced from one another to define a gap, said exciting means being arranged to generate a stimulus at predetermined locations of said gap in said plane, and each of said conductors having an end face for admission of radiation into the respective conductor, said end faces facing said predetermined plane, and at least one of said end faces defining an angle of about 10 degrees to about 30 degrees therewith, said one end face being designed so that the predominant part of impinging radiation is admitted into and travels along the length of the respective conductor only when the radiation advances along a path which makes an angle equal to or less than an acceptance angle with a normal to said one end face, and said one end face having an edge location which is remote from said gap and defines a line with a selected one of said predetermined locations, said line making an angle equal to or less than said acceptance angle with a normal to said one end face, and wherein each of said end faces has an edge location remote from said gap; and further comprising a reflector adjacent one of said edge locations.

8. The arrangement of claim 7, wherein said reflector is connected to the respective conductor.

9. The arrangement of claim 7, wherein said reflector has a substantially flat reflecting surface.

10. The arrangement of claim 7, wherein said reflector has a curved reflecting surface.

11. The arrangement of claim 10, wherein said reflector has a radius of curvature of about 10 mm to about 30 mm.

12. The arrangement of claim 11, wherein said radius is about 20 mm.

13. The arrangement of claim 10, wherein said reflecting surface is substantially elliptical and has a focus within said gap in said predetermined plane.

14. The arrangement of claim 7, wherein said exciting means comprises means for producing exciting radiation, said reflector having greater reflectance for radiation emitted in response to the exciting radiation than for the exciting radiation.

15. The arrangement of claim 14, wherein said reflector has a reflecting surface heat-treated so as to have greater reflectance for radiation emitted in response to the exciting radiation than for the exciting radiation.

16. The arrangement of claim 7, further comprising an additional reflector adjacent the other of said edge locations.

17. The arrangement of claim 16, wherein said additional reflector is connected to the respective conductor.

18. An arrangement for reading information in radiation emitted from an excitable surface portion, comprising means for supporting the excitable surface portion in a predetermined plane; means for exciting the excitable surface portion; and a pair of radiation conductors which are spaced from one another to define a gap, said exciting means being arranged to generate a stimulus at predetermined locations of said gap in said plane, and each of said conductors having an end face for admission of radiation into the respective conductor, said end faces facing said predetermined plane, and at least one of said end faces defining an angle of about 10 degrees to about 30 degrees therewith, said one end face being designed so that the predominant part of impinging radiation is admitted into and travels along the length of the respective conductor only when the radiation advances along a path which makes an angle equal to or less than an acceptance angle with a normal to said one end face, and said one end face having an edge location which is remote from said gap and defines a line with a selected one of said predetermined locations, said line making an angle equal to or less than said acceptance angle with a normal to said one end face, and further comprising a common photo detector for said conductors.

19. The arrangement of claim 18, wherein said photodetector comprises a photomultiplier.

20. A method of reading information stored in a storage medium, comprising the steps of providing a pair of radiation conductors including a plurality of optical fibers, each having an end face for admission of radiation into the respective conductor, at least one of said end faces being designed so that the predominant part of impinging radiation is admitted into and travels the length of the respective conductor only when the radiation advances along a path which makes an angle equal to or less than an acceptance angle with a normal to said one end face, and said one end face having an edge location; positioning said conductors with a gap between the same and with said end faces directed towards said gap and towards a predetermined plane, the positioning step including establishing an angle of about 10 degrees to about 30 degrees between said one end face and said predetermined plane, and the positioning step further including locating said edge location remotely from said gap so that said edge location and a selected location of said gap in said plane define a line making an angle equal to or less than said acceptance angle with a normal to said one end face; arranging said storage medium with a surface portion thereof in said plane and passing through said selected location; and exciting said surface portion at said selected location to cause emission of radiation from said surface portion towards said end faces.

21. The method of claim 20, further comprising the step of photoelectrically converting radiation which has traveled through said conductors into electronic signals.

22. The method of claim 20, wherein the exciting step comprises directing a laser beam towards said selected location.

* * * * *